United States Patent [19]

Robertson

[11] 4,379,108
[45] Apr. 5, 1983

[54] STRENGTHENING PHOSPHATE SHALE BRIQUETTES

[75] Inventor: James A. Robertson, Levittown, Pa.

[73] Assignee: FMC Corporation, Philadelphia, Pa.

[21] Appl. No.: 122,099

[22] Filed: Feb. 19, 1980

[51] Int. Cl.$^3$ .............................................. C04B 35/64
[52] U.S. Cl. .......................................... 264/56; 264/63
[58] Field of Search ..................................... 264/63, 56

[56] References Cited

U.S. PATENT DOCUMENTS

| | | | |
|---|---|---|---|
| Re. 26,843 | 3/1970 | Ziegler et al. | 264/117 |
| 1,534,828 | 4/1925 | Barr | 75/257 |
| 2,040,081 | 5/1936 | Curtis | 23/313 R |
| 3,032,408 | 5/1962 | Baumann | 71/64 |
| 3,189,433 | 6/1965 | Hollingsworth | 71/37 |
| 3,598,754 | 8/1971 | Thummler et al. | 252/313 R |
| 3,620,972 | 11/1971 | Fite | 252/1 |
| 3,760,048 | 9/1973 | Sullivan | 264/56 |

*Primary Examiner*—James H. Derrington
*Attorney, Agent, or Firm*—Frank Ianno; Eugene G. Seems

[57] ABSTRACT

The strength of phosphate shale agglomerates or briquettes is enhanced by adding to and mixing with crushed phosphate shale ore tempering water and a water-soluble alkali metal or ammonium phosphate. The water-soluble phosphate salt is preferably dissolved in the tempering water and the solution sprayed onto the crushed shale ore. The tempering water is added in an amount to bring the moisture content of the mixture between about 9 and 12%. The phosphate salt is added in an amount up to 0.1%. The mixture is compacted into desired size and the compacts calcined.

8 Claims, No Drawings

STRENGTHENING PHOSPHATE SHALE BRIQUETTES

This invention relates to a method for enhancing the strength of phosphate shale agglomerates or briquettes suitable as a furnace feed in the electric arc furnace for the production of phosphorus.

The phosphate ores occurring in the western part of the United States are characterized as phosphate shale, the phosphorus being present as calcium phosphate. The deposits include several strata with varying phosphate contents. The upper stratum, generally referred to as Mill Shale, contains less than about 20% phosphate ($P_2O_5$) and is not suitable as a furnace feed. The next lower or intermediate stratum, generally referred to as Furnace Grade, usually contains between about 20% and about 30% phosphate and is used to form the furnace feed. The lower stratum, generally referred to as Acid Grade or High Grade, contains at least about 30% phosphate and is used in the production of fertilizer. In general, the higher the phosphate content the lower the clay content. The strata are not precisely defined, but blend into each other.

In addition to the calcium phosphate and clay, the deposits also include silica, iron oxide, organic matter, other metal oxides in small proportions and a small proportion (up to about 4%) of shale oil. The phosphate shale is a weathered, loosely-consolidated rock which during mining and transporting to the phosphorus producing plant becomes disintegrated into a mass consisting of fragments or particles ranging in size down to fines. The phosphorus is obtained by reduction of the ore with carbon, generally coke, in an electric arc furnace.

Generally, the furnace efficiency varies inversely with the proportion of fines in the furnace feed. Also, excess fines in the feed causes erratic furnace operation. In the operation of the electric arc furnace, therefore, the furnace feed should be substantially free of fines so as to maintain a high furnace efficiency, to prevent loss of the fines in the stack gases and to prevent contamination of the phosphorus containing off-gases. Accordingly, the phosphate shale as transported to the phosphorus producing plant can not be used directly in the electric arc furnace.

At the phosphorus producing plant, the mined phosphate shale that is derived from the intermediate stratum is stored in stock piles. When required in the operation of the plant, the stored shale is moved to the plant by conventional earth moving equipment which may further disintegrate the shale. The shale is transferred to suitable conveyors which transport it to screens. The material retained on the screens (at least $\frac{3}{4}$ inch in size) may be used as a portion of the furnace feed. Alternatively, all of the shale may be transported to suitable crushing or grinding mills, such as a hammer mill, so as to crush or grind all of the shale to a size under about $\frac{3}{4}$ inch. The material passing through the screens, or alternatively, the crushed material is subjected to an agglomerating or briquetting operation followed by drying and calcining so as to provide the desired furnace feed.

The principal purpose of the invention is to enhance the strength of phosphate agglomerates or briquettes.

A further purpose of the invention is to render the clay content of phosphate shale more effective in contributing to the strength of phosphate agglomerates or briquettes.

Another purpose of the invention is to enhance the strength of agglomerates or briquettes formed of blends of "sandy" shale and furnace grade shales.

A further purpose of the invention is to enhance the strength of agglomerates or briquettes formed of blends of calcined fines and furnace grade shale.

In accordance with the present invention, a small proportion of a water-soluble alkali metal or ammonium phosphate is added to the mass to be agglomerated or briquetted prior to the specific compacting operation. Conveniently, the phosphate salt may be dissolved in the tempering water that is added to bring the moisture content of the mass to a desired value. The amount of phosphate salt required to substantially enhance the strength of the agglomerates or briquettes is from about 0.025% to about 0.1% based upon the weight of the solids of the briquetting mass.

In the practice of the invention, the shale is crushed so that the crushed material includes particles varying in size from fines up to about one-half to three-quarters inch. Generally, the crushing is effected by the use of a hammer mill, however, any conventional crushing or grinding equipment is satisfactory which will reduce the phosphate shale to the desired size. The crushed shale is subsequently compacted into pillow briquettes of a size which may vary from about $1\frac{5}{8}$ to 2 inches. The crushed shale is moisturized so as to contain between about 9% to about 12% moisture, preferably about 10.5% to about 11.5%. This moisture content is required to provide green briquettes with sufficient cohesiveness and strength during handling and calcining. The strength of calcined briquettes varies directly with the strength of the green briquettes. The naturally occurring clay present in the briquetting mass serves as the binder for the green briquettes. During calcining, the clay becomes sintered and provides a ceramic bond in the calcined briquettes.

Some phosphate shale referred to as "dry" or "sandy" shale, does not contain a sufficient amount of clay to allow formation of satisfactory briquettes. Such grades of shale when moisturized form what may be termed a gritty or harsh mix low in plasticity and lacking in cohesiveness. If shale of higher clay content is available, the dry or sandy shale may be blended with sufficient shale of higher clay content to form a mixture which can be used to produce satisfactory briquettes. Acid grade shale which is unsatisfactory for the production of briquettes may be blended with furnace grade shale to provide a mixture which may be briquetted. Fines are formed during the handling and calcining of green briquettes and the handling of calcined briquettes. In the operation of the furnace, fines or dust are recovered from stack gases and the phosphorus vapors. These fines contain phosphate values which are recoverable. The fines when blended with crushed shale do not contribute a binding action and tend to render the mixture somewhat similar to dry or sandy shale.

Some of the above described mixtures or blends might be classed as marginal composites from the standpoint of briquetting mixes. The moldability or briquetting properties may be substantially improved by the practice of this invention. Where high amounts of clay are present, as in Mill Shales containing below about 20% phosphate and not generally used as an electric arc furnace feed, the addition of the phosphate salt has little if any effect. Because of the low phosphate content, these types of shales are not used to form briquettes for use as furnace feeds at the present time. Where very low amounts of clay are present, as in Acid Grade Shales containing above about 30% phosphate, the addition of the phosphate salt has no effect. The phosphate salt in the very small proportions used does not function as an adhesive or binding agent. The invention is applicable to shales and blends containing from about 20% to about 30% phosphate. The invention is of particular advantage in the briquetting of dry or sandy shales and marginal composites.

The very small proportion of water-soluble phosphate salt must be present in aqueous solution when added to the briquetting mixture. Merely adding the salt per se does not improve the moldability of the mixture. The solution functions when added just prior to the mixing of the material so that the solution becomes thoroughly distributed within the mass and the mass then transferred to the briquetting or compacting rolls. The precise action of the dissolved phosphate salt is not understood although it is suspected that the salt in solution improves the clay dispersion. The solution when incorporated in the various materials improves the plasticity of the mixtures and enhances the strength of the briquettes. It is possible that the solution renders the clay present in the mixture more effective and thus results in the enhanced strength of the briquettes.

In operation, the material to be compacted is transferred or delivered by means of conveyor belts to a hopper which feeds the mass to suitable mixing apparatus. A highly effective method for adding the phosphate salt to the briquetting mass involves dissolving the phosphate salt in the tempering water. As the mass drops from the end of the conveyor belt, the phosphate salt solution is sprayed onto both sides of the falling ribbon of particles or the particles fall through a mist of the salt solution. From the hopper the mass of particles is passed to suitable mixing equipment, such as, for example, bin baffles, ploughs. a pug mill, muller or the like, so as to effect a thorough blending of the constituents. The blended mass is then delivered to the compacting apparatus where the mass is compacted with conventional briquette rolls into 2 inch or other desired size pillow briquettes. Since the time elapsing from the time the mass is delivered to the hopper to the time the mass passes to the compacting apparatus is very brief, a matter of several minutes, the spraying of the salt solution onto both sides of the falling ribbon of particles is most effective in insuring a uniform distribution of the solution throughout the mass. The formed briquettes are dried and calcined, preferably by placing them on a perforated carrier which passes through a drying and calcining zone.

The following examples illustrate the practice of the present invention and are not to be taken as limiting the invention to the specific phosphate shales and mixtures. In these examples, compacts were prepared from representative furnace grade, acid grade and Mill shales and blends of furnace and acid grade shales and blends of furnace grade shale and calcined fines. The shale samples were received from Idaho and had screen analyses as set forth in Table I. Samples C and D had been dried and crushed to pass a 10 mesh screen prior to shipment from Idaho. Samples A and B were crushed in a porcelain mortar to pass a 10 mesh screen. The major portion of the contained clay is found in the fraction which passes the 400 mesh screen and it might be suspected that there would be a direct correlation between briquette strength and this fraction. However, finely divided silica contributes to this fraction without a significant contribution to the plasticity of the briquetting mix and to the briquette strength. The effectiveness of silica in creating a bond between the particles is relatively insignificant as to that of clay.

In all instances, the shale samples, mixtures of shales and mixtures of shale and calcined fines were blended by tumbling in a jar. Following blending the samples were transferred to a large mortar and the tempering water or a solution of sodium tripolyphosphate added and the mass mulled with a pestle until the mix was homogeneous. The mass was then returned to the jar and sealed until used.

In preparing prototype briquettes, 40.0 g portions of the moisturized mix removed from the respective jars were pressed in a 1⅛ inch die (1 sq. inc. cross section) at a pressure of 2000 psi, care being exercised to permit both the plunger and plug to move freely to maximum pressure. Upon removal from the die, each compact was weighed immediately. After completion of each set of six compacts or briquettes, they were dried in a circulating air oven at 110° C. overnight and again weighed individually. The weight losses were used to calculate the moisture content of the briquetting mixture. The moisture content as set forth in Table II represents the average water content for 6 briquettes.

The dried briquettes were crushed on an Instron Testing Machine with plunger movement of 0.05 in./min., chart speed of 1 in./min. and chart factor at 5000 lb./sq.in. full scale. The load cell was calibrated with a 25 lb. weight.

The average crushing strength of the groups of compacts prepared from the various briquetting mixes is shown in Table II. The variation in crushing strength of individual compacts of each group is indicated by the coefficient of variation. The increase in average strength resulting from the addition of the phosphate salt to the briquetting masses is reported in the proportion of increase in the average strength over that of the corresponding control compacts.

The enhancement in the strength of briquettes prepared from briquetting mixes to which the phosphate salt has been added is apparent from Table II. Thus the addition of 0.05% STPP to the furnace grade shale (A) resulted in a 50% increase in the average strength of the compacts as compared to the strength of the control compacts. In the case of a poor briquetting mix, Example 5, the strength is almost doubled by the addition of 0.1% STPP.

An unexpected improvement resulting from the practice of the invention is the uniformity of the strengths of the briquettes. The uniformity is illustrated by the lower deviation of the strength of individual briquettes from the average strength for any single group of briquettes. For example, the strength of individual compacts formed from the furnace grade shale (A) exhibit a coefficient of variation of ±23.8% from the average strength of the group of compacts. The incorporation of 0.05% STPP in the mix resulted in a reduction of the coefficient of variation to ±4.5%. Mill shales (C and D) per se which contain adequate amounts of clay for briquette formation but are not used at present because of the low phosphate content may or may not exhibit an increase in strength. The addition of the phosphate salt to the Mill shales does not effect a greater uniformity in strength between briquettes.

Although the foregoing examples illustrate the enhancement of strength obtained by the use of sodium tripolyphosphate, other water-soluble polyphosphates are also satisfactory. In a further series of experiments the furnace grade shale (A) was crushed to a −10 mesh size as described above. In order to simulate a very poor quality (sandy) type shale, the crushed shale was mixed with an equal quantity of powdered silica (Silex). Portions of the mixture were transferred to a mortar and tempering water or a phosphate salt solution added and the mass mulled with a pestle until the mix was homogeneous. The mass was then placed in a jar and sealed until used. The amount of salt solution added was such as to add 0.10% of each salt to the mix.

Briquettes were prepared by placing 40.0 g. portions of each mix in a 1½ inch die and pressing, using a pressure of 2000 lb/sq.in. Each compact was weighed immediately and groups of compacts were dried in a circulating air oven at 110° C. overnight and again weighed individually. The weight losses were used to calculate the moisture content of the briquetting mixes.

The dried briquettes were crushed on an Instron Testing Machine using the conditions described above. The crushing strengths as reported in Table III are averages for each set of compacts prepared from mixes having the stated moisture contents and stated added phosphate salt. The table also indicates the percentage increase in strength obtained by adding the respective phosphate salts to the briquetting masses.

It will be noted that the crushing strengths are considerably lower than the corresponding strengths as shown in Table II for briquettes prepared from Shale A. These lower strengths are attributable to the deliberate dilution of Shale A with an equal quantity of powdered silica.

Following the agglomerating or briquetting operation, the agglomerates or briquettes are preferably placed on an endless perforated carrier or grate that carries them through drying, calcining and cooling zones. The speed of the carrier is such as to retain the briquettes in the calcining zone for from about 15 to about 25 minutes. During calcining the briquettes are heated to a temperature of from about 2000° F. (1095° C.) to about 2500° F. (1375° C.).

Enhancement of the strength of the green briquettes or compacts (briquettes prior to calcination) effects a reduction in the formation of fines produced during the transfer of the briquettes from the briquetting rolls or other forming apparatus to the carrier for transport through the drying, calcining and cooling zones. The higher strength of the green briquettes appears to account for a reduction in the amount of fines produced during calcination of the briquettes. Further, the higher strength of the calcined briquettes attributable to the higher strength of the green briquettes decreases the amount of fines formed during handling of the calcined briquettes. Thus, economies in the overall operations are effected by the reduction in the amount of fines which must be recycled to the mixing and briquetting operations.

TABLE I

| Screen Size* | Sample A | B | C | D |
|---|---|---|---|---|
| +⅜ inch | 10.17 | 29.82 | — | — |
| +4 mesh | 7.56 | 7.52 | — | — |
| +20 mesh | 12.50 | 14.32 | 23.68 | 19.21 |
| +50 mesh | 5.93 | 26.03 | 13.29 | 10.41 |
| +80 mesh | 9.82 | 8.00 | 9.57 | 4.82 |
| +100 mesh | 6.56 | 0.46 | 5.19 | 2.82 |
| +200 mesh | 3.53 | 2.46 | 6.51 | 6.41 |
| +270 mesh | 2.12 | 1.04 | 2.82 | 3.54 |
| +400 mesh | 6.03 | 1.73 | 5.23 | 8.69 |
| −400 mesh | 33.97 | 8.23 | 33.64 | 43.31 |

*U.S. Standard
Screen analyses were run after one hour scrubbing in water
Sample A — Furnace grade shale (24.54% $P_2O_5$)
Sample B — Acid grade shale (32.5% $P_2O_5$)
Sample C — Unweathered Mill Shale (14.98% $P_2O_5$)
Sample D — Weathered Mill Shale (12.84% $P_2O_5$)

TABLE II

| Example | Composition | % $H_2O$ | % STPP | Average Crushing Strength lbs/sq.in. | Coefficient of Variation % | % Increase in Average Strength |
|---|---|---|---|---|---|---|
| 1 | 100% A | 10.2 | — | 1486 ± 353 | ±23.8 | — |
| 2 | 100% A | 10.7 | 0.025 | 1987 ± 295 | ±14.8 | 34 |
| 3 | 100% A | 10.5 | 0.05 | 2227 ± 101 | ±4.5 | 50 |
| 4 | 100% B | 6.2 | — | 182 ± 57 | ±31.3 | — |
| 5 | 50%A,50%B | 7.7 | — | 991 ± 253 | ±25.5 | — |
| 6 | 50%A,50%B | 8.1 | 0.1 | 1937 ± 173 | ±8.9 | 95 |
| 7 | 75%A,25%X | 10.3 | — | 1630 ± 161 | ±9.9 | — |
| 8 | 75%A,25%X | 10.1 | 0.1 | 2230 ± 58 | ±2.6 | 37 |
| 9 | 100% C | 11.4 | — | 1506 ± 141 | ±9.4 | — |
| 10 | 100% C | 11.2 | 0.1 | 1902 ± 230 | ±12.1 | 26 |
| 11 | 100% D | 11.9 | — | 2082 ± 163 | ±7.8 | — |
| 12 | 100% D | 11.9 | 0.025 | 2042 ± 168 | ±8.2 | −2 |

X — Calcined fines from plant operations

% Coefficient of variation = $\frac{\text{Deviation from average strength}}{\text{Average strength}} \times 100$

TABLE III

| Example | Additive | % $H_2O$ | Average Crushing Strength lbs./sq.in. | % Increase in Strength |
|---|---|---|---|---|
| 13 | — | 11.63 | 312 | — |
| 14 | 0.1% STPP | 11.85 | 595 | 90.7 |
| 15 | 0.1% TSPP | 12.26 | 737 | 136.2 |
| 16 | 0.1% SHMP | 11.86 | 585 | 87.5 |
| 17 | 0.1% Ortho | 12.51 | 488 | 56.4 |

STPP — Sodium tripolyphosphate
TSPP — Tetrasodium pyrophosphate
SHMP — Sodium hexametaphosphate
Ortho — Mixture of sodium orthophates having same Na:P ratio as STPP

I claim:

1. The method of producing phosphate shale agglomerates of enhanced strength which comprises adding to and mixing with crushed phosphate shale ore, the crushed ore containing from about 20% to about 30% by weight $P_2O_5$ and including particles varying in size from fines up to about ¾ inch, tempering water and a water-soluble alkali metal or ammonium phosphate, the amount of water being sufficient to bring the moisture content of the mixture between 9 and about 12%, the water-soluble phosphate being added in an amount up to about 0.1% by weight of the phosphate shale, compacting the mixture to form green briquettes, calcining the green briquettes at a temperature of from about 2,000° F. (1,095° C.) to about 2,500° F. (1,375° C.) and recovering the calcined briquettes.

2. The method of claim 1 wherein the water-soluble alkali metal or ammonium phosphate is dissolved in the tempering water and the water-soluble phosphate salt is added in an amount of between about 0.025 and about 0.1% by weight of the phosphate shale.

3. The method of claim 2 wherein the added water-soluble phosphate salt is sodium tripolyphosphate.

4. The method of claim 2 wherein the added water-soluble phosphate salt is sodium pyrophosphate.

5. The method of claim 2 wherein the added water-soluble phosphate salt is sodium hexametaphosphate.

6. The method of claim 2 wherein the added water-soluble phosphate salt is a mixture of sodium orthophosphates, the mixture having the same sodium to phosphorus ratio as that of sodium tripolyphosphate.

7. The method of claim 2 wherein the crushed phosphate shale ore is transferred on a conveyor from which it drops to a mixer, the tempering water containing the dissolved water-soluble phosphate salt is sprayed onto the crushed shale ore as it drops from the conveyor and the moistened crushed shale ore is mixed to uniformly distribute the moisture and dissolved phosphate salt through the mixture before it is compacted.

8. The method of claim 1 wherein calcined fines are mixed with the crushed phosphate shale ore.

* * * * *